United States Patent
Meager (10) Patent No.: US 10,543,874 B2
(45) Date of Patent: Jan. 28, 2020

(54) LOW GRAVITY ALL-SURFACE VEHICLE AND STABILIZED MOUNT SYSTEM

(71) Applicant: PAHA DESIGNS, LLC, Felt, ID (US)

(72) Inventor: Benjamin Meager, Felt, ID (US)

(73) Assignee: PAHA DESIGNS, LLC, Felt, ID (US)

( * ) Notice: Subject to any disclaimer, the term of this patent is extended or adjusted under 35 U.S.C. 154(b) by 0 days.

(21) Appl. No.: 15/982,561

(22) Filed: May 17, 2018

(65) Prior Publication Data

US 2018/0334201 A1    Nov. 22, 2018

Related U.S. Application Data

(60) Provisional application No. 62/507,598, filed on May 17, 2017.

(51) Int. Cl.
| | | |
|---|---|---|
| *B62D 37/04* | (2006.01) | |
| *B60K 7/00* | (2006.01) | |
| *G05D 1/00* | (2006.01) | |
| *B60B 27/02* | (2006.01) | |

(52) U.S. Cl.
CPC ............ *B62D 37/04* (2013.01); *B60K 7/0007* (2013.01); *G05D 1/0011* (2013.01); *B60B 27/02* (2013.01)

(58) Field of Classification Search
CPC .... B60K 7/0007; B62D 37/04; G05D 1/0011; B60B 27/02; B60L 50/00
See application file for complete search history.

(56) References Cited

U.S. PATENT DOCUMENTS

| | | | |
|---|---|---|---|
| 1,357,571 A | 11/1920 | Knepper | |
| 1,905,345 A | 4/1933 | Dandini | |
| 1,915,886 A | 6/1933 | Gutierrez | |
| 3,016,967 A * | 1/1962 | Rehfeld | B60B 19/14 |
| | | | 152/109 |
| 3,661,212 A | 5/1972 | Johnson | |
| 3,667,156 A | 6/1972 | Tomiyama et al. | |
| 3,905,323 A | 9/1975 | Kacere | |
| 4,102,542 A | 7/1978 | Pirre, Jr. et al. | |

(Continued)

FOREIGN PATENT DOCUMENTS

| | | |
|---|---|---|
| CN | 203496596 | 3/2014 |
| WO | WO 01/28796 | 4/2001 |

(Continued)

OTHER PUBLICATIONS

"Servomotor," Wikipedia, last modified Dec. 2015, 5 pages [retrieved Jan. 21, 2016 from: en.wikipedia.org/wiki/Servomotor.

(Continued)

*Primary Examiner* — Rachid Bendidi
(74) *Attorney, Agent, or Firm* — Sheridan Ross P.C.

(57) ABSTRACT

Vehicles are disclosed that are configured to carry loads in a stabilized manner, such that the load is maintained in a substantially constant position or orientation relative to a predetermined reference point or frame even as the vehicle moves. A stabilization controller in such a vehicle receives information about movement of the vehicle relative to the reference point or plane from one or more sensors on the vehicle, and uses the information to control one or more movable objects by which the load is secured to the vehicle so as to maintain a relatively constant relationship between the load and the reference point or plane.

11 Claims, 7 Drawing Sheets

(56) References Cited

U.S. PATENT DOCUMENTS

| | | | |
|---|---|---|---|
| 4,501,569 | A | 2/1985 | Clark, Jr. et al. |
| 4,726,800 | A | 2/1988 | Kobayashi |
| 6,302,494 | B1 | 10/2001 | DiMarco et al. |
| 6,328,123 | B1 | 12/2001 | Niemann et al. |
| 7,494,398 | B2 | 2/2009 | Laurienzo |
| 8,807,254 | B2 | 8/2014 | Manus |
| 2002/0011368 | A1 | 1/2002 | Van Den Berg |
| 2003/0010551 | A1 | 1/2003 | Shirazawa |
| 2003/0213630 | A1* | 11/2003 | Pyntikov ................ B60L 50/64 180/220 |
| 2004/0092206 | A1 | 5/2004 | Lynders et al. |
| 2005/0023052 | A1 | 2/2005 | Beck et al. |
| 2011/0106339 | A1* | 5/2011 | Phillips ................ G05D 1/0033 701/2 |
| 2012/0302390 | A1 | 11/2012 | Lemire-Elmore et al. |
| 2013/0049498 | A1 | 2/2013 | Boughtwood |
| 2013/0153311 | A1 | 6/2013 | Huntzinger |
| 2014/0341329 | A1* | 11/2014 | Goder ................ B25J 5/007 376/249 |
| 2018/0022208 | A1 | 1/2018 | Calleija et al. |

FOREIGN PATENT DOCUMENTS

| | | |
|---|---|---|
| WO | WO 2010/077300 | 7/2010 |
| WO | WO 2016/119022 | 8/2016 |

OTHER PUBLICATIONS

International Search Report and Written Opinion for International (PCT) Patent Application No. PCT/US15/23557, dated Jul. 13, 2015 12 pages.

International Preliminary Report on Patentability for International (PCT) Patent Application No. PCT/US2015/023557, dated Oct. 13, 2016 9 pages.

Extended Search Report for European Patent Application No. 15773659.6, dated Dec. 1, 2017 7 pages.

Official Action for U.S. Appl. No. 14/674,764, dated Feb. 4, 2016, 6 pages.

Notice of Allowance for U.S. Appl. No. 14/674,764, dated Jun. 7, 2016, 8 pages.

Official Action for U.S. Appl. No. 15/272,721, dated Jan. 19, 2018 7 pages Restriction Requirement.

Official Action for U.S. Appl. No. 15/272,721, dated May 18, 2018 10 pages.

Official Action for U.S. Appl. No. 15/639,664, dated Jan. 19, 2018 8 pages Restriction Requirement.

Official Action for U.S. Appl. No. 15/639,664, dated Apr. 2, 2018 8 pages.

Official Action for U.S. Appl. No. 15/436,502, dated Jan. 19, 2018 7 pages Restriction Requirement.

Official Action for U.S. Appl. No. 15/436,502, dated Apr. 2, 2018 6 pages.

Notice of Allowance for U.S. Appl. No. 15/436,502, dated May 9, 2018 5 pages.

International Search Report and Written Opinion for International (PCT) Patent Application No. PCT/SU2018/039398, dated Aug. 30, 2018 13 pages.

Official Action for U.S. Appl. No. 15/272,721, dated Oct. 9, 2018 10 pages.

Notice of Allowance for U.S. Appl. No. 15/639,664, dated Sep. 4, 2018 5 pages.

Official Action for U.S. Appl. No. 15/982,601, dated Apr. 18, 2019 6 pages Restriction Requirement.

\* cited by examiner

LOW GRAVITY ALL-SURFACE VEHICLE AND STABILIZED MOUNT SYSTEM

CROSS-REFERENCE TO RELATED APPLICATIONS

The present application claims the benefit of U.S. Provisional Patent Application No. 62/507,598, filed on May 17, 2017 and entitled "Low Gravity All-Surface Vehicle and Stabilized Mount System," which is incorporated herein by reference in its entirety.

FIELD

The present disclosure relates generally to the field of ground and amphibious vehicles. More specifically, it relates to lowering the center of gravity of ground and amphibious vehicles, regardless of whether they are remotely operated, computer controlled or direct driven vehicles. The disclosure also relates to systems mounted on a vehicle that are stabilized.

BACKGROUND

Known surface vehicles are useful and valuable to this day, but are limited in their use due to their inability to corner and travel at high speeds. As an example, a High Mobility Multipurpose Wheeled Vehicle commonly known as the Humvee, or a high clearance demonstration vehicle such as the Monster Truck, can climb over very large objects. However, both vehicles have the undesired tendency to flip over when cornering too quickly or when climbing an object that is too steep. This undesired effect is primarily caused by having the majority of each vehicle's weight, and therefore its center of gravity, well above the wheels. In contrast, an advanced race car, such as a Formula One race car, has its center of gravity close to the ground. As a result, it has the ability to corner at very high speeds. The body of a Formula One race car, however, is also very close to the ground. This prevents it from climbing over objects of even the smallest size, making it a ground vehicle that is ideal for high speed cornering, but not acceptable for climbing over objects as required by all-terrain vehicles.

The solution for combining both of these benefits is utilized in vehicles disclosed herein to great effect. Embodiments of the vehicles disclosed herein are capable of both cornering at high speeds and climbing large objects. The vehicles have this capability due to a dramatically lower center of gravity relative to traditional vehicles and in some cases, because they utilize very large wheels.

Prior art vehicles have been created with a low center of gravity and a single large wheel, but the use of only one wheel in these designs has created yet another dramatic limitation. When attempting to accelerate at high speeds or climb large objects, these single-wheel vehicles are susceptible to the motorized portion of their interior spinning off-axis, thus preventing the vehicle from operating at all. With a vehicle that has only one wheel, the axis or axle of the vehicle is not fixed on a plane. Gravity and weight alone keep the power unit from free-spinning inside the wheel. Due to this limitation, over-accelerating the vehicle can allow the insides of the vehicle to spin off-axis, such that the wheel and vehicle remain stationary while the insides of the vehicle spin. Embodiments of vehicles disclosed herein solve this problem by using more than one wheel to keep the axis and axles in-plane, thus allowing for rapid acceleration, high speed cornering and the ability to climb large objects.

SUMMARY

A vehicle is provided with the ability to traverse a number of different obstacles. A system mounted to such a vehicle is also described and a stabilization system for the mount is further described. Additional details of a low-gravity vehicle are further provided in U.S. Pat. No. 9,457,647 to Meager, entitled "Low Gravity All-Surface Vehicle," the entire contents of which are hereby incorporated herein by reference.

According to at least one embodiment of the present disclosure, a vehicle generally comprises:
a frame comprising a plurality of axles each having a plurality of axes;
a plurality of wheels, each wheel rotatably connected to a corresponding axle of the plurality of axles and defining an inner volume;
a plurality of frame mounts, each frame mount positioned within the inner volume of one of the plurality of wheels and connected to the corresponding axle, each frame mount further having a portion extending below an axis of the corresponding axle, which portion supports a propulsion unit drivingly coupled to the wheel;
a load supported by the frame via one or more selectively movable objects; and a stabilization controller that controls the one or more selectively movable objects based on information about movement of the vehicle relative to a reference point or plane;
wherein the center of gravity of each of the plurality of wheels is below the axis of the corresponding axle.

In some embodiments, the one or more movable objects include a rotatable arm having at least two portions that are movable relative to one another.

In some embodiments, the information comprises inputs received by the stabilization controller from one or more sensors mounted to the frame or to one or more of the plurality of wheels.

In some embodiments, the inputs received from the one or more sensors enable the stabilization controller to determine a movement of the frame relative to the reference point or plane and further enable the stabilization controller to generate one or more control signals that cause the one or more selectively movable objects to counteract the movement of the frame, thereby stabilizing the load relative to the reference point or plane.

In some embodiments, the stabilization controller is configured to extend or retract the one or more selectively movable objects in response to determining that the frame is moving up or down relative to the reference point or plane.

In some embodiments, the stabilization controller is configured to rotate the one or more selectively movable objects in response to determining that the frame is tilting relative to the reference point or plane.

In some embodiments, the one or more sensors include one or more of the following: an accelerometer, a magnetometer, an altimeter, a tilt sensor, a strain gauge, and a pressure transducer.

In some embodiments, the load comprises a camera or a manipulator arm.

In some embodiments, the one or more movable objects comprises a telescoping arm.

In some embodiments, the load comprises a detachable load carried by the frame.

In some embodiments, the portion of the frame mount extending below the axis of the corresponding axle supports a control unit and an energy source.

In accordance with at least another embodiment of the present disclosure, a system generally comprises:

a first movable object comprising at least one propulsion device;

a second movable object coupled to the first movable object, wherein the second movable object supports a load for conveyance by the first movable object;

one or more sensors coupled with the first movable object and configured to generate inputs based on sensed information about motion or tilt of the first movable object relative to a reference point or plane; and a stabilization controller coupled with the one or more sensors, wherein the stabilization controller receives the inputs from the one or more sensors and provides, based on the inputs, first control signals to the second movable object that cause the second movable object to move the load relative to the first movable object and toward a predetermined position or orientation defined in relation to the reference point or plane.

In some embodiments, the stabilization controller generates second control signals for operating the first movable object and third control signals for causing the second movable object to move the load relative to the first movable object, wherein the third control signals correspond to the second control signals.

In some embodiments, the first movable device is configured to travel by water or air.

In some embodiments, the first movable object comprises a plurality of wheels, each wheel rotating about an axle and defining an inner volume, each wheel further comprising a frame mount supporting a motor and an energy source.

In some embodiments, the frame mount supports the motor and the energy source below an axis of the axle.

In some embodiments, the second movable object comprises a motor, a first arm portion, and a second arm portion, wherein the first arm portion and the second arm portion are connected to the motor via at least one wire, and further wherein the first arm portion is movable relative to the second arm portion.

According to at least a further embodiment of the present disclosure, a system generally comprises:

a self-propelled vehicle;

a load;

a selectively movable object secured to the self-propelled vehicle and supporting the load;

a plurality of sensors for detecting movement of the self-propelled vehicle relative to a reference point or plane; and a stabilization controller that receives information from the plurality of sensors about the detected movement and causes the selectively movable object to adjust the position of the load relative to the self-propelled vehicle based on the information.

In some embodiments, the self-propelled vehicle is controllable remotely.

In some embodiments, the selectively movable object is driven by at least one control motor.

DETAILED DESCRIPTION

Figure 1:
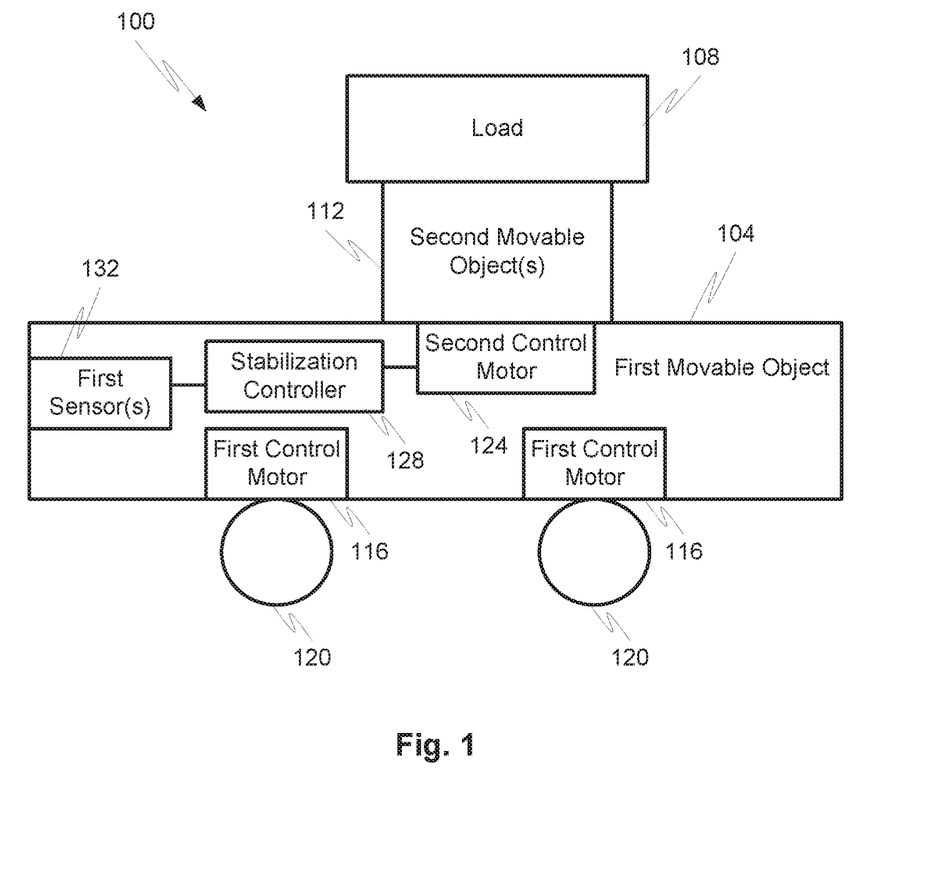
FIG. 1 is a block diagram of a vehicle according to one embodiment of the present disclosure.

With reference initially to FIG. 1, an illustrative vehicle 100 is depicted to include a first movable object 104 that carries a load 108. The load 108 is supported on the first movable object with one or more second movable objects 112.

The first movable object 104 may be driven (e.g., propelled) or controlled by one or more first control motors 116. The first control motors 116 may be or comprise one or more electric motors coupled to a source of electricity (e.g., a battery, fuel cell, or other means of storing or generating electricity), and/or one or more engines configured to burn gasoline, diesel fuel, natural gas, hydrogen, or any other fuel. The first control motors 116 may be sized based on the size, weight, and/or operating requirements of the first movable object 104, the second movable object(s) 112, and the load 108. The first control motor(s) 116 may be provided with a wireless transceiver and configured to receive operational instructions from a remote controller, or the first control motor(s) 116 may include an integral control element such as, for example, one or more of an electronic speed control, a throttle, an electronic engine controller, an engine control unit, or any other engine control device. In some embodiments, the first control motor(s) 116 provide operational power to wheels, tracks, or the like 120 that enable the first movable object 104 to move in any number of directions. Also in some embodiments, the first movable object 104 may comprise—for example and in addition to or instead of the first control motor(s) 116 and the wheels, tracks, or the like 120—wings, rotors, propellers, jets, and/or other lifting and/or propulsion devices enabling the first movable object 104 to fly, float, or otherwise move off-land.

The second movable object(s) 112 may be mounted to the first movable object 104 via one or more adjustable members. The adjustable members enable the second movable object(s) 112 to change a relative position between the load 108 and the first movable object 104. In particular, the second movable object(s) 112 may be movable so as to enable the load 108 to maintain, or to maintain the load 108 in, a relatively stable position relative to an external reference point (e.g., a ground reference plane, a vertical reference plane, or any other reference point or plane that is external to the first movable object 104, etc.) even though the first movable object 104 is moving relative to the external reference point or plane. In other words, the second movable object(s) 112 may move the load 108 toward a desired position or orientation relative to the external reference point or plane, to counteract movements of the load 108 away from the desired position or orientation caused by or resulting from movement of the first movable object 104. The second movable object(s) 112 may be manipulated or otherwise caused to move by one or more second control motors 124. The second control motors 124 may include servo motors, rotors, gears, pneumatic pumps, hydraulic pumps, and the like that enable the second movable objects 112 to be manipulated or otherwise moved. The second control motors 124 may be positioned directly on and/or attached directly to one or more portions of the second movable object(s) 112, or the second control motors 124 may be positioned at or near the base of the second movable object(s) 112 and attached to one or more portions of the second movable object(s) 112 via, for example, one or more gears, wires, cables, chains, rods, and/or other force-transmitting connectors. The second movable object(s) 112 may include, for example, any type of pneumatic device, telescoping device, rotatable device, folding device, hydraulic device, geared control mechanism, wired control mechanism, or the like that is capable of adjusting or causing to be adjusted a relative position between the load 108 and the first movable object 104.

The second control motor 124 may receive one or more inputs from a stabilization controller 128 that provides the second control motor 124 with control instructions that stabilize the load 108 relative to the external reference point or plane. The stabilization controller 128 may comprise, for example, a processor; a computer-readable, non-transitory memory containing instructions for execution by the processor; one or more sensor interfaces; and a motor interface. Upon execution of instructions stored in the memory, the processor may receive one or more inputs from the first sensor(s) 132 via the one or more sensor interfaces, calculate or otherwise determine (based on the one or more inputs) a displacement of the first movable object 104 relative to the external reference point or plane, generate motor control instructions for the second control motor 124 based on the calculated or determined displacement, and transmit the motor control instructions to the second control motor 124 via the motor interface. The motor control instructions may cause the second movable object(s) 112 to move the load 108 in a way that counteracts the sensed movement of the first movable object 104. In some embodiments, one or more of the one or more sensor interfaces and the motor interface may comprise a wireless transceiver (including an antenna), thus enabling the stabilization controller 128 to communicate wirelessly with the first sensor(s) 132 and/or the second control motor 124. In other embodiments, one or more of the one or more sensor interfaces and the motor interface may comprise a wired transceiver for enabling wired communications with the first sensor(s) 132 and/or the second control motor 124.

In operation, then, the stabilization controller 128 may receive one or more inputs from first sensor(s) 132 that are deployed on or about the first movable object 104. As a non-limiting example, the first sensor(s) 132 may include accelerometers, strain gauges, pressure sensors, altimeters, light sensors, sounds sensors, imaging sensors, motion sensors, tilt sensors, global positioning sensors, etc. The first sensor(s) 132 is intended to provide the stabilization controller 128 with information about a state of the first movable object 104 relative to the external reference point or plane. For instance, the first sensor(s) 132 may provide the stabilization controller 128 with information regarding whether the first movable object 104 is tilted relative to a reference plane (or not tilted relative to the reference plane), whether the first movable object 104 is moving vertically (up or down) relative to a reference plane, whether the first movable object 104 is moving forward or backward relative to a vertical reference plane, whether the first movable object 104 is moving relative to a fixed reference point in space, or combinations thereof.

Based on information obtained from the first sensor(s) 132, the stabilization controller 128 can provide motor control instructions to the second control motor(s) 124. The motor control instructions may cause the second control motor(s) 124 to manipulate the second movable object(s) 112 so that motion of the first movable object 104 relative to the external reference point or plane is not transferred, or is only minimally transferred, to the load 108. In other words, the second control motor 124 is adjusted by the second movable object(s) 112 under the control of the stabilization controller 128 and the second control motor 124 to ensure that the load 108 maintains (or is repeatedly returned to) a desired position (e.g., a stable or fixed position) relative to an external reference point or plane regardless of motion of the first movable object 104.

In other embodiments according to the present disclosure, the stabilization controller 128 and the first sensor(s) 132 may be positioned on or adjacent to the load 108. In such embodiments, the first sensors 132 provide the stabilization controller 128 with information about a state of the load 108 relative to the external reference point or plane. For instance, the first sensor(s) 132 may provide the stabilization controller 128 with information regarding whether the load 108 is tilted relative to a reference plane (or not tilted relative to the reference plane), whether the load 108 is moving vertically (up or down) relative to a reference plane, whether the load 108 is moving forward or backward relative to a vertical reference plane, whether the load 108 is moving relative to a fixed reference point in space, or combinations thereof.

In such embodiments, where the stabilization controller 128 and the first sensor(s) 132 are positioned on or adjacent to the load 108, the stabilization controller 128 can provide motor control instructions to the second control motor(s) 124 based on the information obtained from the first sensor(s) 132. As in the embodiment illustrated in FIG. 1, the motor control instructions may cause the second control motor(s) 124 to manipulate the second movable object(s) 112 so that the position of the load 108 relative to external reference point or plane remains relatively constant, notwithstanding movement of the first movable object 104. In other words, the second control motor 124 is adjusted by the second movable object(s) 112 under the control of the stabilization controller 128 and the second control motor 124 to ensure that the load 108 maintains a desired position (e.g., a stable or fixed position) relative to an external reference point or plane regardless of motion of the first movable object 104.

The vehicle 100 may include any type of movable conveyance. The vehicle 100 may be designed to travel by land, water, air (e.g., fly), or a combination thereof. The nature of the load 108 may also vary depending upon the nature of the first movable object 104. In some embodiments, the load 108 may correspond to a payload carried by the first movable object 104. The payload may be integrally-attached to the first movable object 104 or the load 108 may be temporarily carried by the first movable object 104. As can be appreciated, the nature of the load 108 and the nature of the first movable object 104 may control the types of second movable object(s) 112 needed to stabilize the load 108 relative to the first movable object 104.

One non-limiting example of a first movable object 104 is an all-terrain ground vehicle. An illustrative example of a vehicle 200 that can be used to represent vehicle 100 is shown in FIGS. 2A-3B, and an illustrative example of a vehicle 300 that can be used to represent vehicle 100 is shown in FIGS. 4A-5B. The vehicle 200 is similar to the vehicle 100 in that the vehicle 200 includes a chassis 204 that operates as a first movable object 104. The chassis 204 is carried by a plurality of wheels 220. The wheels 220 may be driven by internal or integral motors and motor controllers. For example, the wheels 220 may be identical to or substantially the same as the wheels described in U.S. Pat. No. 9,457,647, which as previously noted is incorporated by reference herein in its entirety. One or more of the wheels 220 may comprise, for example, a frame mount fixedly or rotatably secured to a wheel axle, the frame mount supporting some or all of an energy source (e.g., a battery), a motor, and a motor controller (e.g., an electronic speed control or other control unit) at or below the wheel axle so that the center of gravity of the wheel 220 (including the components thereof) is lower than an axis of the wheel axle. On or more of the wheels 220 may be independently controllable, and the wheels 220 may be operated and controlled to cause the vehicle 200 to move forward and backward, and to turn/rotate (e.g., by causing wheels 220 on one side of the vehicle 200 to rotate forward while the wheels 220 on the other side of the vehicle 220 are stopped or rotate backward). It should be appreciated, however, that in some embodiments the motors and/or motor controllers for the wheels 220 may be connected to the chassis 204 rather than being integrated into the wheels 220. The motors and motor controllers for the wheels 220 may be considered examples of first control motors 116.

Figure 2A:
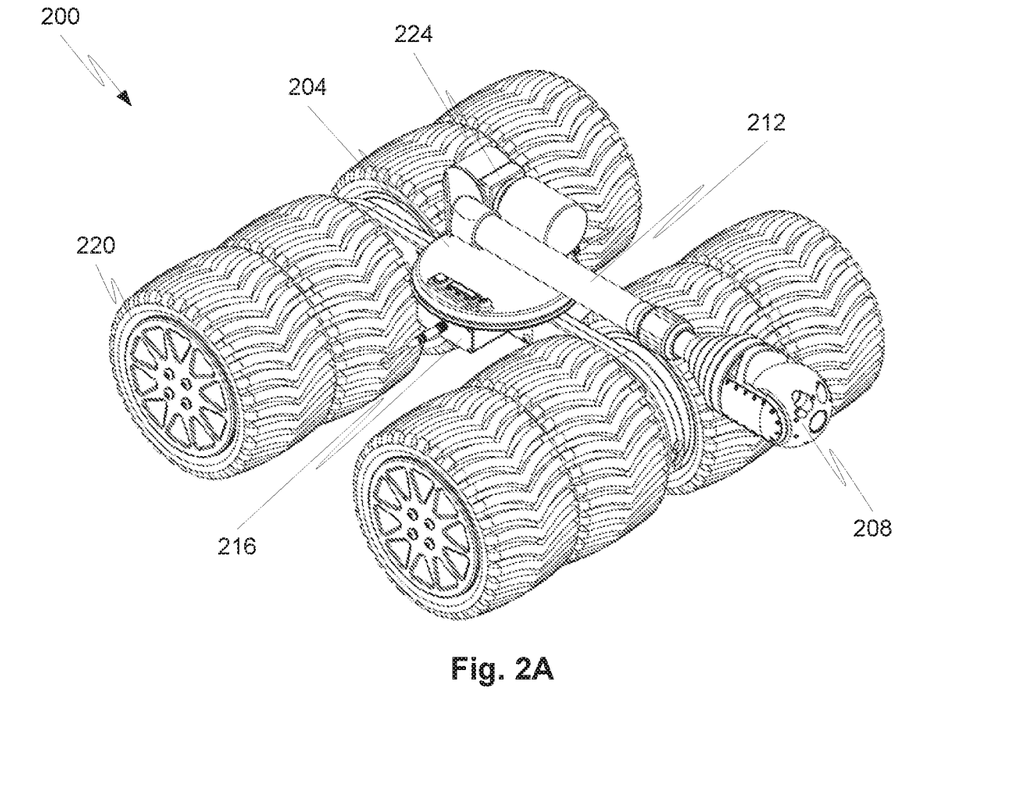
FIG. 2A is a perspective view of a vehicle according to another embodiment of the present disclosure, in a first configuration.
Figure 2B:
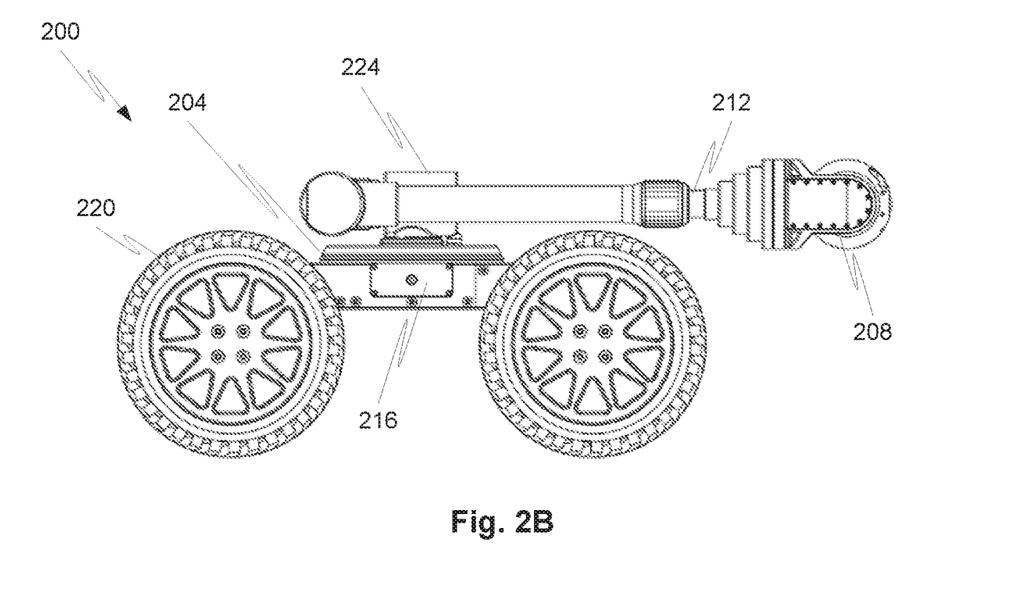
FIG. 2B is a side elevation view of the vehicle of FIG. 2A, in the first configuration.

A rotatable and extendable arm 212 is connected to the chassis 204. One or more arm control motors 224 may also be mounted to the chassis 204. The arm control motors 224 may mechanically manipulate and move the arm 212 or components thereof (e.g., telescoping components, rotatable components, and/or other components). The arm control motors 224 may receive control signals from a stabilization controller 216 that is also mounted to the chassis 204. Although not depicted, the stabilization controller 216 may receive inputs from one or more sensors 132 mounted to or integrated with the chassis 204. In addition to receiving sensor input, the stabilization controller 216 may also receive inputs from an external controller (e.g., a remote control) that enables a user to remotely control or actuate movements of the arm 212. The same remote control may also be used to provide instructions to the motors and motor controllers of the wheels 220. The stabilization controller 216 and/or one or more of the wheels 220 (or one or more components thereof) may be provided with a wireless transceiver and antenna for receiving such inputs from an external controller.

A camera 208 is mounted at the end of the arm 212. Specifically, the arm 212 is shown to have a first end and a second end. The first end of the arm 212 may be connected with or proximate to the chassis 204 whereas the second (and opposite) end of the arm 212 may be connected with or proximate to the camera 208. The camera 208 is one example of a load 108.

As will be discussed in further detail herein, the stabilization controller 216 may have the ability to control various motional/rotational aspects of the arm 212 to ensure that the camera 208 is maintained in a substantially stable state relative to a fixed reference point or plane (e.g., five feet above a reference plane, or aimed at a fixed reference point). The stabilization of the camera 208 may be maintained even though the chassis 204 is moving, tilting, or the like. In some embodiments, the stabilization controller 216 and the arm 212 may be configured to evaluate the position of the vehicle 200 and/or of the load 208 relative to the external reference point or plane multiple times per second, and to constantly adjust the position of the load 208 relative to the vehicle 200 to maintain the position or orientation of the load 208 relative to the external reference point or plane. In other embodiments, the stabilization controller 216 and the arm 212 may be configured to evaluate the position of the vehicle 200 and/or of the load 208 relative to the external reference point or plane at intervals of one second or longer. The length of the interval between each determination of the relative position of the vehicle 200 and/or of the load 208 relative to the external reference point or plane (or relative to each other) and between each corrective movement of the arm 212, together with the velocity of the vehicle 200 (in all directions, including due to the self-propelled movement of the vehicle 200 and due to the environment over or through which the vehicle 200 travels), will determine how stable the load 208 remains relative to the external reference point or plane.

For example, if corrections (e.g., movements of the arm 212 as directed by the stabilization controller 216 to maintain the position or orientation of the load 208 relative to the external reference point or plane, or movements of the arm 212 as directed by the stabilization controller 216 to move the load 208 back toward the desired position or orientation of the load 208 relative to the external reference point or plain) are made multiple times per second, and the vehicle 200 has a low velocity, then each correction will likely be relatively small, and may even appear to be continuous (if the number of corrections per second is relatively high). On the other hand, and again by way of example, if corrections are made only every five seconds (for example), and the vehicle 200 has a high velocity, then each correction is likely to be relatively large. Moreover, the ability of the stabilization controller 216 and the arm 212 to maintain the position of the load 208 relative to the external reference point or plane will increase as the interval between each correction decreases, and decrease as the interval between each correction increases. The rapidity with which the arm 212 is able to move from one position to another will also affect the ability of the stabilization controller 216 and the arm 212 to maintain the position of the load 208 relative to the external reference point or plane.

In some embodiments, the stabilization controller 216 may receive (whether directly or indirectly) control signals intended for controlling the operation of the wheels 220 or other motors or propulsion systems of the vehicle 200, and based on such control signals may generate corresponding control signals for the arm 212. For example, if the control signals intended for controlling the operation of the wheels 220 will cause the vehicle 200 to turn, then the stabilization controller 216 may generate corresponding control signals for causing the arm 212 to rotate in the opposite direction, so as to maintain a particular orientation of the load 208 relative to the external reference point or plane. In embodiments where the stabilization controller 216 receives control signals intended for controlling the operation of the wheels 220 or other motors or propulsion systems of the vehicle 200, the stabilization controller 216 can generate anticipatory control signals for the arm 212 to counteract the effect of any commanded changes in the velocity of the vehicle 200.

Relatedly, the stabilization controller 216 may in some embodiments control movement of the vehicle 200 (e.g., by controlling movement of the wheels 220, individually or collectively) in addition to movement of the arm 212. Alternatively, the stabilization controller 216 may receive information from one or more other controllers of the vehicle 200 (e.g., one or more controllers configured to control movement of the wheels 220 individually or collectively, and/or of the vehicle 200) about to-be-commanded movements of the wheels 220 and/or of the vehicle 200). In either arrangement, the stabilization controller 216 may generate control signals for the arm 212 that are based on corresponding control signals generated for the wheels 220 (individually or collectively) or for the vehicle 200 more generally. The control signals for the arm 212 and for the wheels 220/vehicle 200 may be transmitted simultaneously or nearly simultaneously, and may ensure that the arm 212 moves as necessary to maintain a particular orientation of the load 208 relative to the external reference point or plane given the commanded movement of the wheels 220/vehicle 200. Thus, in such embodiments, rather than reacting to sensed movement of the vehicle 200, the stabilization controller 216 proactively controls the arm 212 to maintain a desired orientation of the load 208 relative to the external reference point or plane.

Even so, environmental factors may cause momentary, uncontrolled changes in the velocity of the vehicle 200 (e.g., the vehicle 200 may bounce after hitting a bump, or may tilt up or down on an incline), which the stabilization controller 216 does not anticipate. In these instances, the stabilization controller 216 and the arm 212 must necessarily react to changes in the relative position of the load 208 and/or of the vehicle 200 relative to the external reference point or plane as they happen or after they happen. As a result, the stabilization controller 216 and the arm 212 may be unable to keep the load 208 in exactly the same position or orientation relative to the external reference point or plane, even with a short interval between each successive correction. For this reason, the stabilization controller 216 may be configured to permit or accept a predetermined amount of undesired movement of the load 208 relative to the external reference point or plane. Moreover, the stabilization controller may be configured to recognize the limits of movement of the arm 212, and to not generate control signals that attempt to cause the arm 212 to move the load 208 beyond those limits of movement. Thus, for example, if the stabilization controller 216 is configured to maintain a load five (5) feet above a predetermined reference plane, but the terrain over which the vehicle 200 travels rises to greater than five (5) feet above the reference plane in question, then the arm 212 may be physically unable to hold the load 208 at the desired position, and the stabilization controller 216 may be configured to hold the load 208 as close as possible to the desired position relative to the reference plane until the terrain changes and the stabilization controller 216 is again able to hold the load 208 at the desired position.

Figure 3A:
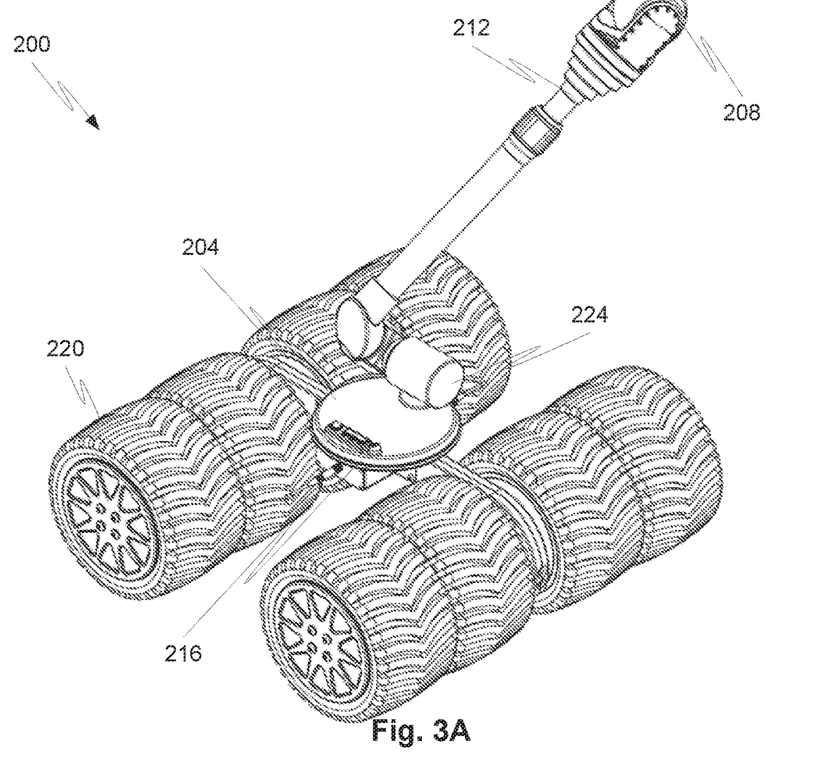
FIG. 3A is a perspective view of the vehicle of FIG. 2A, in a second configuration.
Figure 3B:
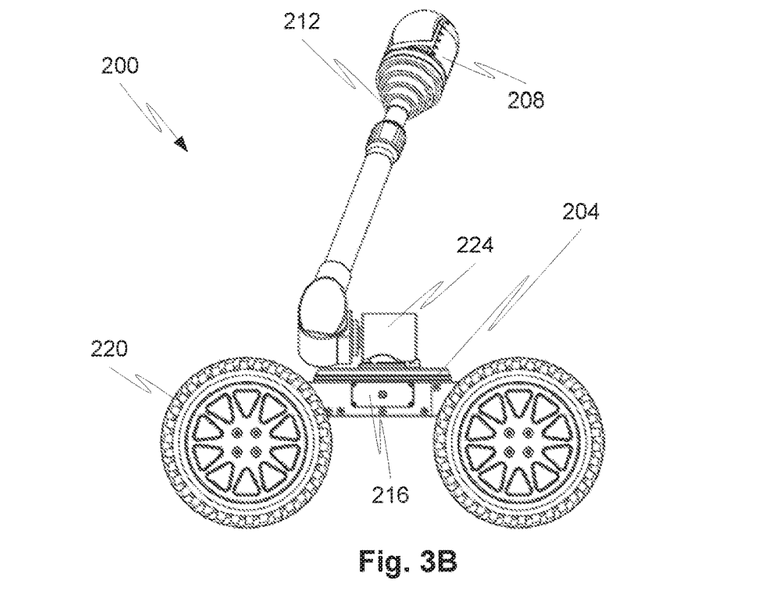
FIG. 3B is a side elevation view of the vehicle of FIG. 2A, in the second configuration.
Figure 4A:
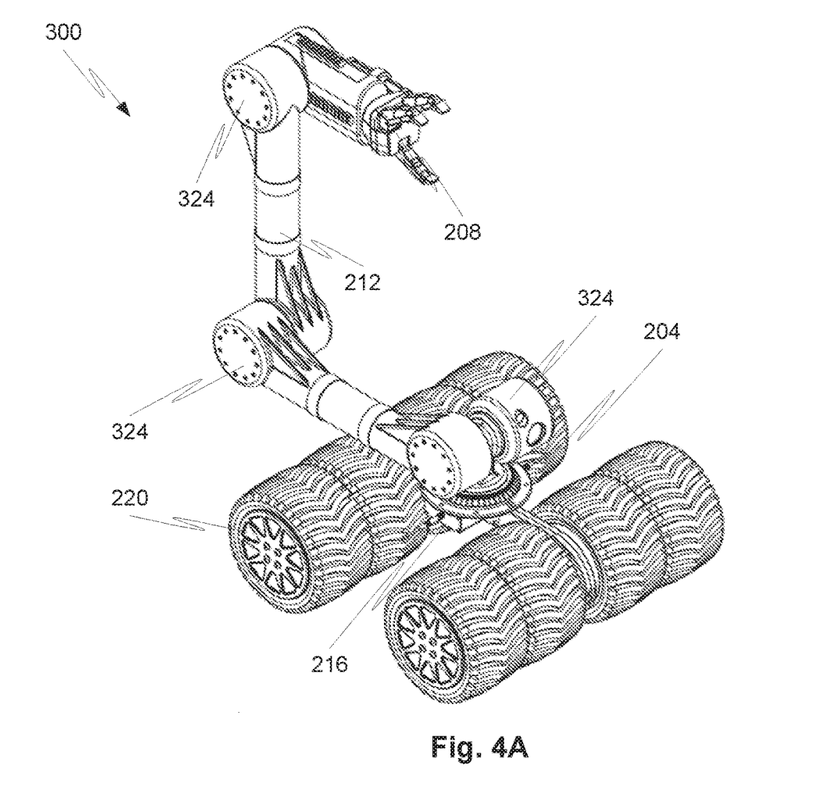
FIG. 4A is a perspective view of a vehicle according to yet another embodiment of the present disclosure, in a first configuration.
Figure 4B:
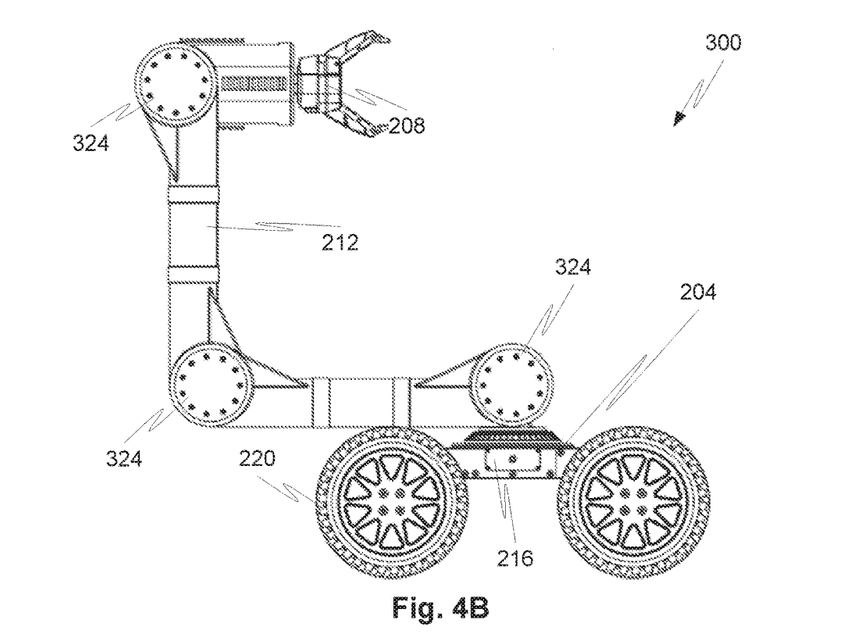
FIG. 4B is a side elevation view of the vehicle of FIG. 4A, in the first configuration.
Figure 5A:
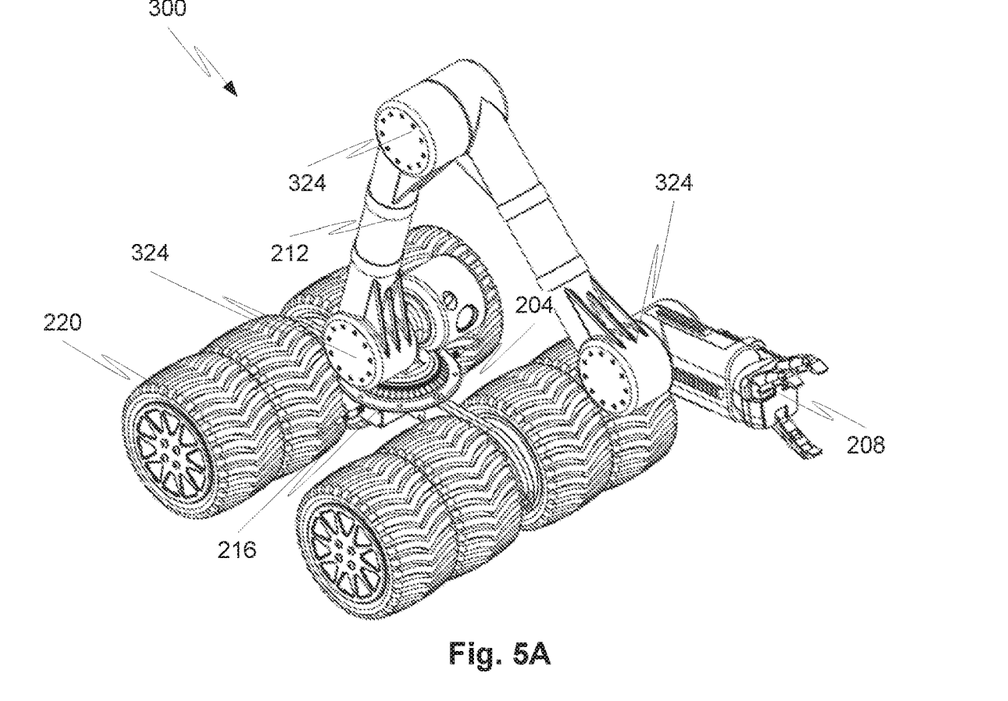
FIG. 5A is a perspective view of the vehicle of FIG. 4A, in a second configuration.
Figure 5B:
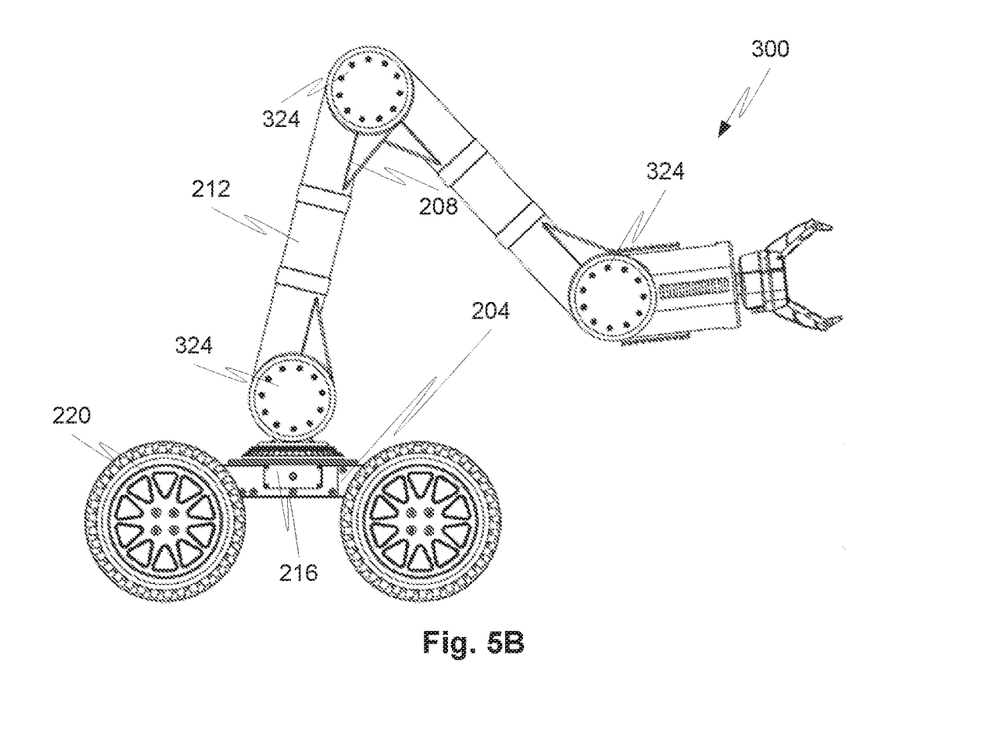
FIG. 5B is a side elevation view of the vehicle of FIG. 4A, in the second configuration.

FIGS. 3A and 3B depict the arm 212 in a semi-extended state whereby the camera 208 is now elevated relative to the chassis 204. As a non-limiting example, the stabilization controller 216 may control the rotation and/or extension of the arm 212 in such a way that the camera 208 is substantially fixed and/or focused on a reference point (or area). The vehicle 200 may be allowed to move in any number of directions (including up or down, left or right, etc.) and the camera 208 may be automatically directed and focused at a reference point (e.g., an area of interest). The arm 212 may also be controlled to extend or retract with its telescoping capabilities to keep (or try to keep) the camera 208 at a relatively constant height even though the chassis 204 is moving up or down relative to a reference plane.

FIGS. 4A-5B depict another non-limiting example of a load in the form of a manipulator 208. In this example the arm 212 is shown to include a plurality of rotational points 324. The movement of the rotational points 324 as well as of the manipulator 208 may be controlled by the stabilization controller 216. Alternatively or additionally, motor controllers may be incorporated into the rotational points 324 along with the servo motors that enable rotation at the rotational points 324. Said another way, the stabilization controller 216 may be mounted to the chassis 216 as shown or components of the stabilization controller 216 may be distributed among the motor controllers that independently control various rotational and/or movement aspects for the arm 212. As with the embodiment of FIGS. 2A-3B, the arm 212 of the vehicle 300 is controlled by the stabilization controller 216 to maintain the manipulator 208 in a desired position or orientation relative to an external reference point or plane as the vehicle 300 is in motion.

Figure 6A:
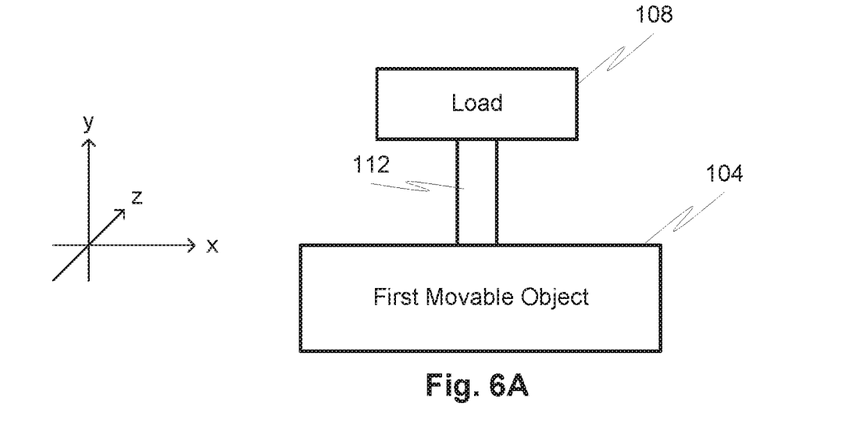
FIG. 6A is a diagram of a first movable object supporting a load according to still another embodiment of the present disclosure, with the first movable object in a first position.
Figure 6B:
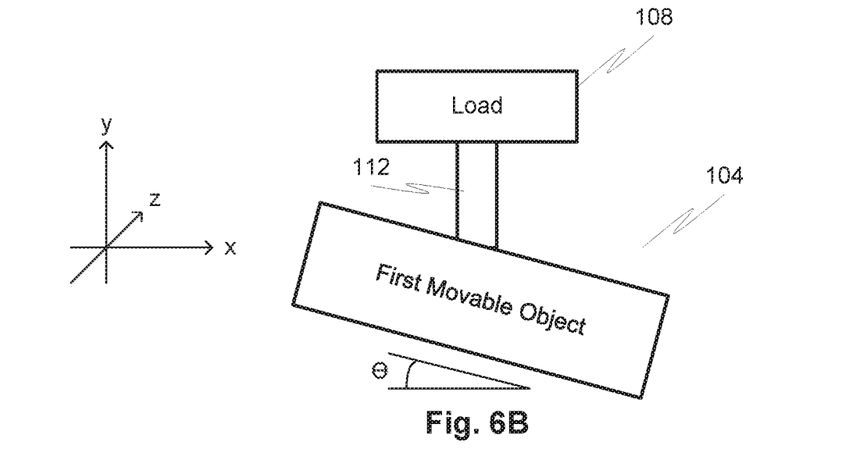
FIG. 6B is a diagram of the first movable object supporting a load of FIG. 6A, with the first movable object in a second position.
Figure 6C:
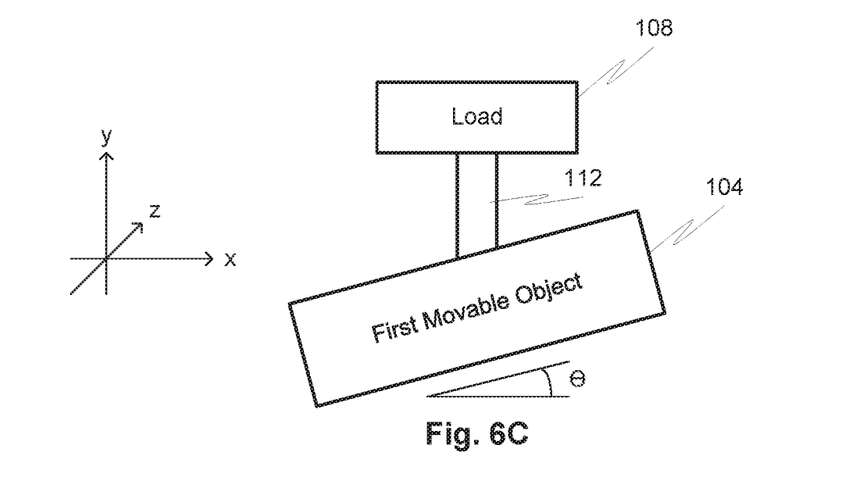
FIG. 6C is a diagram of the first movable object supporting a load of FIG. 6A, with the first movable object in a third position.

With reference now to FIGS. 6A-6C, details of rotational manipulation over the second movable object(s) 112 will be described in accordance with at least some embodiments of the present disclosure. In this illustration, the first movable object 104 is shown to tilt relative to a reference plane (e.g., the x-z reference plane). In this example, the first movable object 104 may be moving and as a result of such movement (e.g., as a result of moving onto a sloping surface) the first movable object 104 may tilt by some angle $\theta$. As the first movable object rotates by angle $\theta$, the second movable object(s) 112 may be manipulated such that the load 108 is tilted relative to the first movable object by the angle $\theta$, so as to be maintained substantially parallel to the reference plane (e.g., the x-z reference plane). The first movable object 104 may tilt in any direction, and the second movable objects 112 may be rotated and/or manipulated such that the position of the load 108 relative to the reference plane remains substantially constant.

Figure 7A:
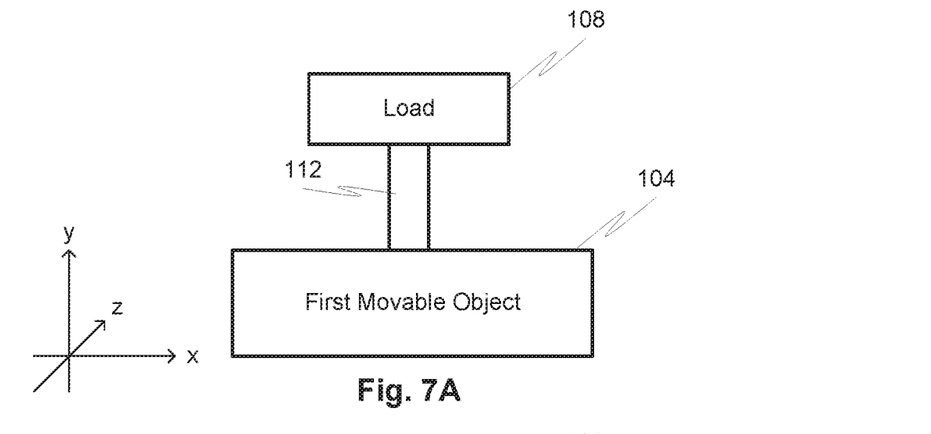
FIG. 7A is a diagram of a first movable object supporting a load according to a further embodiment of the present disclosure, with the first movable object in a first position.
Figure 7B:
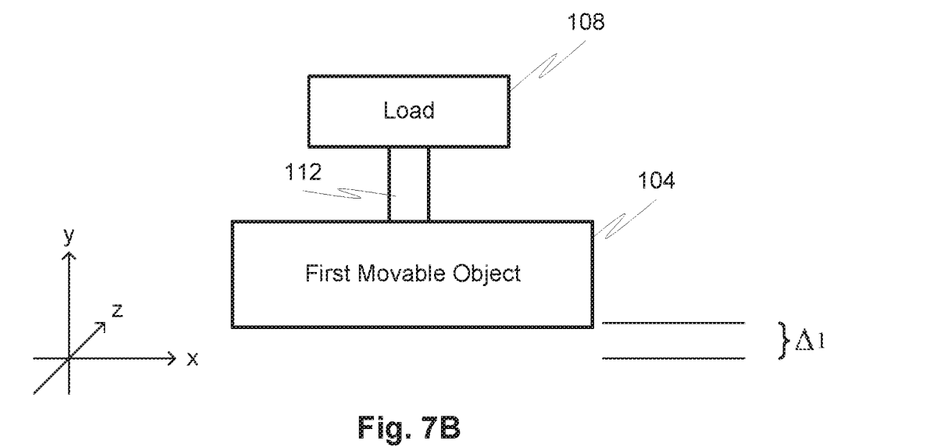
FIG. 7B is a diagram of the first movable object supporting a load of FIG. 7A, with the first movable object in a second position.
Figure 7C:
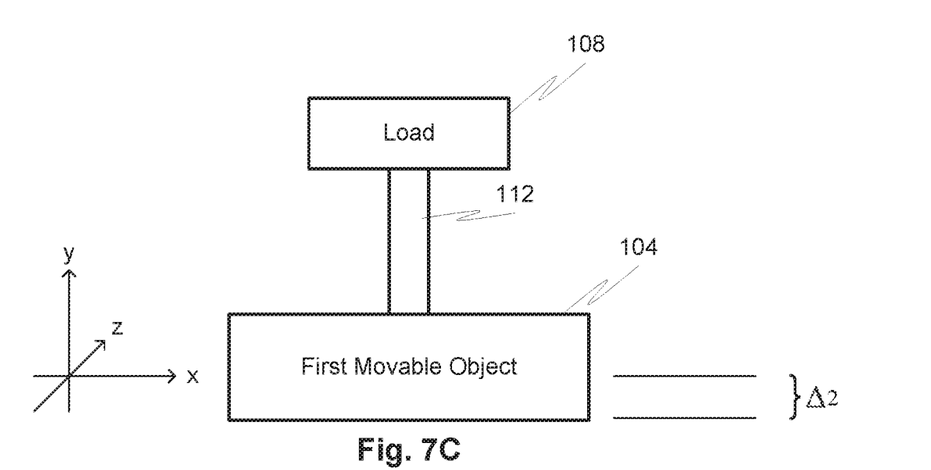
FIG. 7C is a diagram of the first movable object supporting a load of FIG. 7A, with the first movable object in a third position.

FIGS. 7A-7C depict details of manipulation for the movable object(s) 112 when the first movable object 104 moves vertically (e.g., up or down along the y-axis), but it is desired to maintain the load 108 at a substantially fixed position relative to the origin of the y-axis. In some embodiments, an altimeter and/or accelerometer is used to determine a movement of the movable object 104 relative to an initial position or point of origin (e.g., using dead-reckoning position determination algorithms). As the movable object 104 moves up a first distance $\Delta 1$ from a reference plane (e.g., the x-z plane), then the length of the second movable object(s) 112 may be shortened or reduced to maintain a relatively constant distance between the load 108 and the reference plane. Conversely, as the movable object 104 moves down a second distance Δ2 from the reference plane, then the length of the second movable object(s) 112 may be lengthened or extended to maintain the relatively constant distance between the load 108 and the reference plane.

It should be appreciated that the combination of motions depicted in FIGS. 6A-6C and FIGS. 7A-7C may also be accommodated by the manipulation of the second movable object(s) 112. Particularly, the second movable object(s) 112 may be simultaneously moved up and/or down in addition to being rotated to accommodate the rotational motion of the first object 104. Any number of sensor inputs can be used to track this motion of the first movable object 104 relative to a reference point or plane (in a rotational and/or translational manner).

Specific details were given in the description to provide a thorough understanding of the embodiments. However, it will be understood by one of ordinary skill in the art that the embodiments may be practiced without these specific details. Additionally, the Figures do not depict well-known features that may be needed to create a working vehicle so as not to obscure the embodiments in unnecessary detail.

A number of variations and modifications of the disclosure can be used. It would be possible to provide for some features of the disclosure without providing others.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

In some embodiments, one or more aspects of the present disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, any comparable means, or the like. In general, any device(s) or means capable of implementing one or more aspects of the present disclosure illustrated herein can be used to implement the one or more aspects of this disclosure.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Examples of processors as referenced herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARMI Cortex™-M processors, and ARMI Cortex-A and ARM926EJ-S™ processors. A processor as disclosed herein may perform computational functions using any known or future-developed standard, instruction set, libraries, and/or architecture.

What is claimed is:

1. A vehicle comprising:
a frame comprising a plurality of axles having a plurality of axes;
a plurality of wheels, each wheel rotatably connected to a corresponding axle of the plurality of axles and defining an inner volume;
a plurality of frame mounts, each frame mount positioned within the inner volume of one of the plurality of wheels and connected to the corresponding axle, each frame mount further having a portion extending below an axis of the corresponding axle, which portion supports a propulsion unit drivingly coupled to the wheel;
a load supported by the frame via one or more selectively movable objects, at least one of the one or more selectively movable objects comprising a rotatable arm having at least two portions that are movable relative to one another; and
a stabilization controller that controls the one or more selectively movable objects based on information about movement of the vehicle relative to a reference point or plane, the information comprising inputs received by the stabilization controller from one or more sensors mounted to the frame or to one or more of the plurality of wheels;
wherein the center of gravity of each of the plurality of wheels is below the axis of the corresponding axle; and
wherein the inputs received from the one or more sensors enable the stabilization controller to determine a movement of the frame relative to the reference point or plane and further enable the stabilization controller to generate one or more control signals that cause the one or more selectively movable objects to counteract the movement of the frame, thereby stabilizing the load relative to the reference point or plane.

2. The vehicle of claim 1, wherein the stabilization controller further receives inputs from an external controller.

3. The vehicle of claim 1, wherein at least one propulsion unit receives inputs from an external controller.

4. The vehicle of claim 1, wherein the stabilization controller generates the control signals at intervals of one second or less.

5. The vehicle of claim 1, wherein the stabilization controller is configured to extend or retract the one or more selectively movable objects in response to determining that the frame is moving up or down relative to the reference point or plane.

6. The vehicle of claim 1, wherein the stabilization controller is configured to rotate the one or more selectively movable objects in response to determining that the frame is tilting relative to the reference point or plane.

7. The vehicle of claim 1, wherein the one or more sensors include one or more of the following: an accelerometer, a magnetometer, an altimeter, a tilt sensor, a strain gauge, and a pressure transducer.

8. The vehicle of claim 1, wherein the load comprises a camera or a manipulator arm.

9. The vehicle of claim 1, wherein the one or more movable objects further comprises a telescoping arm.

10. The vehicle of claim 1, wherein the load comprises a detachable load carried by the frame.

11. The vehicle of claim 1, wherein the portion of the frame mount extending below the axis of the corresponding axle supports a control unit and an energy source.

* * * * *